Figure 5:
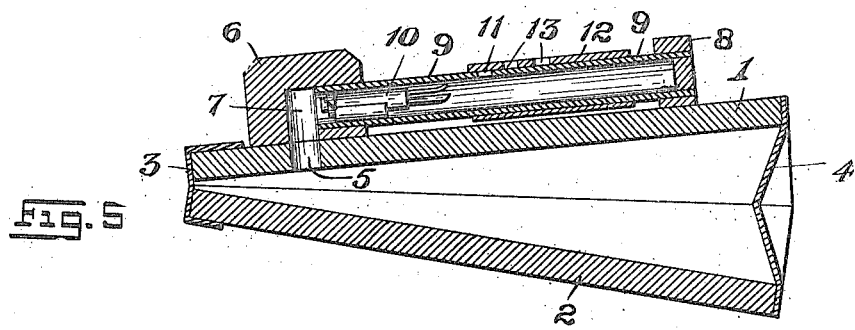

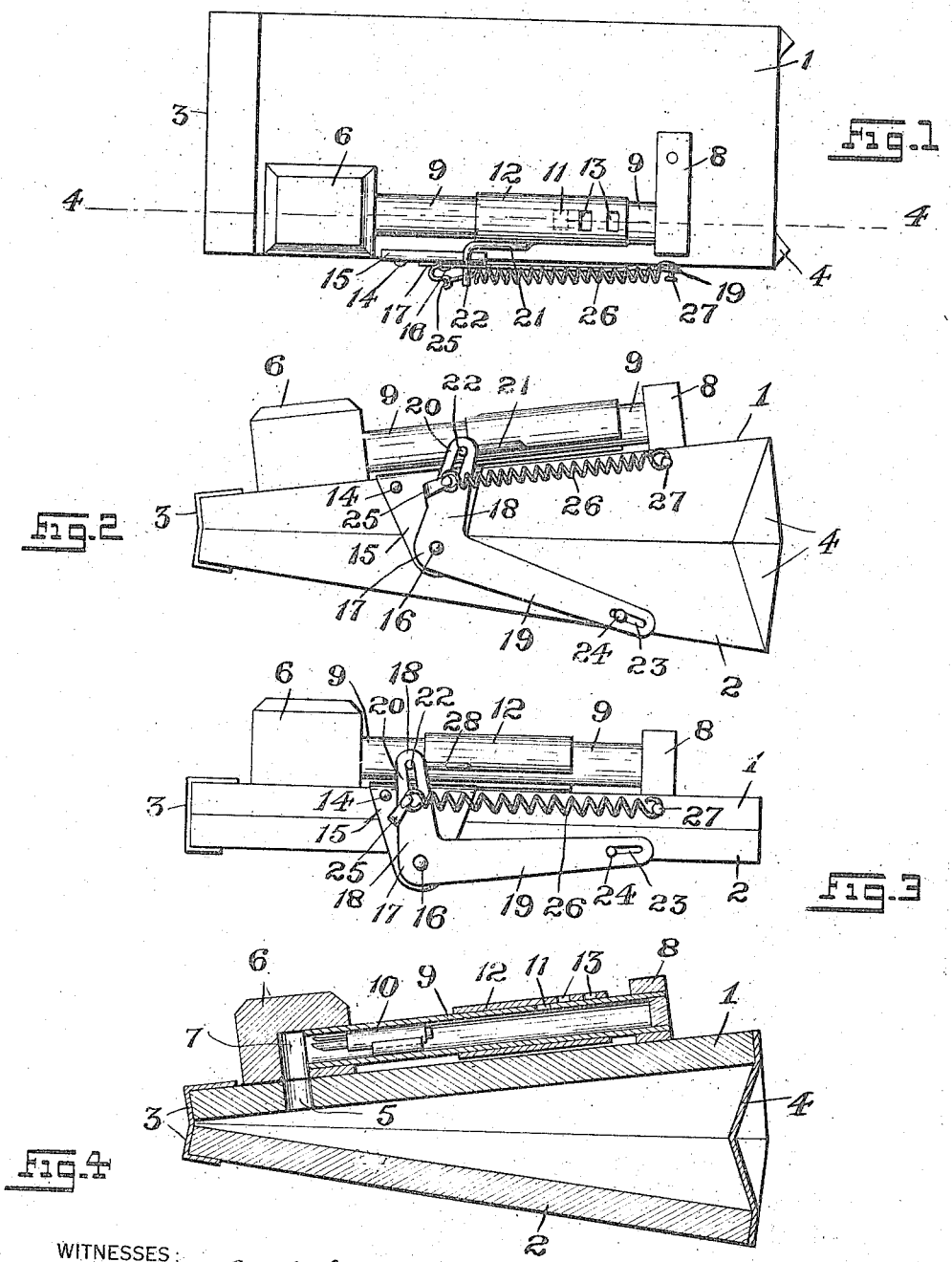

M. RABINOWITZ.
SOUND EMITTING AND CONTROLLING MEANS FOR TOYS.
APPLICATION FILED SEPT. 7, 1915.

1,193,059.

Patented Aug. 1, 1916.
2 SHEETS—SHEET 2.

WITNESSES:

INVENTOR:
Michael Rabinowitz
BY
Fraentzel and Richards
ATTORNEYS

UNITED STATES PATENT OFFICE.

MICHAEL RABINOWITZ, OF NEWARK, NEW JERSEY.

SOUND EMITTING AND CONTROLLING MEANS FOR TOYS.

1,193,059.  Specification of Letters Patent.  Patented Aug. 1, 1916.

Application filed September 7, 1915. Serial No. 49,268.

*To all whom it may concern:*

Be it known that I, MICHAEL RABINOWITZ, a citizen of the United States, residing at Newark, in the county of Essex and State of New Jersey, have invented certain new and useful Improvements in Sound Emitting and Controlling Means for Toys; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to sound-producing or sound-emitting devices or apparatus adapted for use with toys; and, the present invention has reference, more particularly, to a novel sound-producing or sound-emitting and sound-controlling device, to be used with toys of the various kinds, but the mechanism of the device being such and operating in a manner, that the character of the emitted sound is controlled, so as to make the device useful with that class of toys, commonly called talking dolls, and known in the art as "ma-ma" dolls.

The present invention has for its principal objects to provide a novel and simply-constructed, as well as an efficiently operating sound-producing or sound-emitting mechanism for toys, and especially for dolls, in which the arrangement of the operating mechanism is such, that the usual flap-valve structure is entirely omitted, and a mechanism is provided which is always operative and can not get out of order due to rough or careless handling or treatment to which toys of this character are so often subjected.

Other objects of the present invention not at this time more particularly enumerated will be clearly understood from the following detailed description of the present invention.

With the various objects of the present invention in view, the said invention consists, primarily, in the novel sound-producing or sound-emitting and sound-controlling mechanism hereinafter set forth; and the invention consists, furthermore, in the novel arrangements and combinations of the various devices and parts, as well as in the details of the constructions of the said parts, all of which will be more fully described in the following specification, and then finally embodied in the clauses of the claim which are appended to and which form an essential part of the said specification.

The invention is clearly illustrated in the accompanying drawings, in which:—

Figure 1 is a plan or top view of a sound-producing or sound-emitting mechanism, showing one embodiment of the principles of the present invention; and Fig. 2 is a side elevation of the same, the parts of the mechanism, as shown in said Figs. 1 and 2, being represented in their normal initial positions, and comprising a bellows which, when compressed, operates a mechanism for controlling the sound emitted from a reed, during such compression of the bellows. Fig. 3 is a side elevation of the device, illustrating the parts of the mechanism in their operated positions; and Fig. 4 is a longitudinal vertical section of the device, said section being taken on line 4—4 in said Fig. 1. Fig. 5 is a similar sectional representation of a sound-producing or sound-emitting mechanism of a slightly modified construction, but still embodying the principles of the present invention, the parts of the mechanism being of such arrangement, that the sound from the reed is produced during the return of the bellows and the various parts of the sound-controlling mechanism during the return to their normal initial positions, after compression of the bellows.

Similar characters of reference are employed in all of the said above described views, to indicate corresponding parts.

Referring now more particularly to Figs. 1 to 5 inclusive of the drawings, the reference-characters 1 and 2 indicate the members of a bellows, said members being suitably connected in a hinge-like manner, as at 3, and having suitably connected with their longitudinally extending edge-portions and their ends, the usual flexible and foldably disposed fabric-element 4. In a suitable location, one of said members, as 1, is made with a duct or port, as 5, over which is suitably disposed and suitably mounted upon the outer surface of the member 1, a channeled or chambered supporting element, as 6, the channel or chamber 7 thereof being in communication with the duct or port 5, substantially as shown in Figs. 4 and 5 of the drawings. Suitably mounted upon the upper surface of the said member 1 is another supporting element, as 8, with which is suitably connected the closed end-portion of a reed-pipe 9, the opposite open end-portion of said reed-pipe being suitably connected with the said supporting element 6, and being in communication with the duct or port 5, by means of the channel or chamber 7, substantially as illustrated in said Figs. 4 and 5 of the drawings. Of course, it will be clearly understood, that in lieu of the block-like structure of these supporting elements, any other suitably constructed supporting means for mounting the reed-pipe above said member 1 may be employed. Within the said reed-pipe, at the desired point, is a sound-producing reed, as 10, the reed when arranged as shown in said Fig. 4 of the drawing, producing a sound during the compression or movement toward each other of the two members 1 and 2; or, when arranged as indicated in said Fig. 5 of the drawings, producing a sound after compression of the bellows, and during the return-movement of the members 1 and 2 to their normal initial positions. In either case, the reed-pipe or tube 9 is formed with a suitably disposed vent-opening or perforation, as 11; the said openings or perforations in the respective reed-pipes or tubes 9 being located at different points, as shown in said Figs. 4 and 5. In practice, the reed-pipes or tubes are cylindrical, as here shown, but it will be understood that they may be of other shapes, either of a square, rectangular, or other cross-section. Slidably mounted and reciprocally disposed upon said reed-pipe or tube 9 is a sound-controlling element, as 12, which is provided with one or more vent-openings or perforations, as 13, said element 12 normally providing a closure for the said opening or perforation 11, and the plurality of the said vent-openings or perforations 13 being adapted to be successively brought into registration with said opening or perforation 11 to intermittently open and close the same, during the reciprocation of the said sound-controlling element 12, as will be clearly understood from an inspection of the several figures of the drawings. One means is here shown for sliding or moving said sound-controlling element 12 in a rearward or forward direction, but it will be understood, that other mechanisms may be employed for producing such reciprocatory movement of the said sound-controlling element.

In the present instance, there is secured to the side of the member 1 of the bellows, by means of a pin 14, or otherwise, a downwardly extending support or bracket, as 15, which is provided with a pivot-pin 16. Pivotally mounted upon said pivot-pin 16 is a bell-crank 17 having an upwardly extending arm 18 and a forwardly extending arm 19. In its free end-portion, the said arm 18 is provided with an elongated opening or slot 20 into which projects and is operatively arranged therein a finger 22 extending from the end of a rod or bar, as 21, suitably secured to and connected with the previously mentioned sound-controlling element 12. In its free end-portion, the forwardly extending arm 19 of the bell-crank is similarly provided with an elongated opening or slot, as 23, into which projects and is operatively arranged therein an actuating pin 24, said pin being secured to and projecting at the proper point from the side of the other member 2 of the bellows. The said arm 18 of the bell-crank 17 has suitably connected therewith, by means of a hook-shaped attaching member 25, or other suitable fastening means, the one end-portion of a coiled spring 26, said spring having its other end-portion secured upon a pin 27, or other suitable fastening means, attached to and extending from the side of the bellows-member 1, all substantially as shown in Figs. 1, 2 and 3 of the drawings.

The operation of the mechanism just described for actuating the sound-controlling element 12, as well as the manner of emitting the sound, during the compression of the bellows, as in the construction represented in said Figs. 1, 2, 3 and 4 of the drawings, or during the returning of the members 1 and 2 of the compressed bellows, and the operating mechanism to their normal initial positions, when the reed and the various vent-openings or perforations are arranged in the manner illustrated in Fig. 5, will be clearly understood from an inspection of the said Figs. 1 to 5 inclusive, and need not, therefore, be described more fully at this time.

The kinds of sounds to be emitted, such as in imitation of the word "ma-ma" or a succession of intermittent sounds, may be readily produced by varying the sizes and shapes of the openings, and by varying the distances between the openings in the sound-controlling element, or in some instances, if desired, by increasing the number of such vent-holes or perforations in either the sound-controlling element or in the reed.

I am aware, that changes may be made in the general arrangements and combinations of the various devices and parts, as well as in the details of the construction of the said parts, without departing from the scope of the present invention as set forth in the foregoing specification and as defined in the clauses of the claim which are appended to the said specification. Hence, I do not limit my present invention to the exact arrangements and combinations of the said devices and parts as described in the said specification, nor do I confine myself to the exact details of the construction of the said parts, as illustrated in the accompanying drawings.

I claim:—

1. A sound-emitting and controlling means comprising a bellows, a reed-pipe or the like connected with and coöperating therewith, and a sound-controlling element mounted upon said reed-pipe and telescoping therewith so as to be slidably disposed with relation to said bellows and said reed-pipe or the like.

2. A sound-emitting and controlling means comprising a bellows, a reed-pipe or the like connected with and coöperating therewith, and a sound-controlling element mounted upon said reed-pipe and telescoping therewith so as to be slidably disposed with relation to said bellows and said reed-pipe or the like, said reed-pipe being provided with a vent-opening, and the said slidable sound-controlling element being provided with a plurality of openings, adapted to be brought into intermittent registration with the opening in said reed-pipe or the like.

3. A sound-emitting and controlling means comprising a bellows, a reed-pipe or the like connected with and coöperating therewith, a sound-controlling element mounted upon said reed-pipe and telescoping therewith so as to be slidably disposed with relation to said bellows and said reed-pipe or the like, said reed-pipe being provided with a vent-opening, and the said slidable sound-controlling element being provided with a plurality of openings, and means connected with the bellows and the said sound-controlling element for sliding said element and bringing the same into intermittent registration with the opening in said reed-pipe or the like.

4. A sound-emitting and controlling means comprising a bellows, a reed-pipe or the like connected with and coöperating therewith, a sound-controlling element mounted upon said reed-pipe and telescoping therewith so as to be slidably disposed with relation to said bellows and said reed-pipe or the like, said reed-pipe being provided with a vent-opening, and the said slidable sound-controlling element being provided with a plurality of openings, said bellows comprising a pair of compressible bellows-members, a bracket attached to one of said bellows-members, a bell-crank pivoted upon said bracket, one of the arms of said bell-crank being operatively connected with the other bellows-member, and the other arm of said bell-crank being operatively connected with the sliding sound-controlling element for sliding said element and bringing the same into intermittent registration with the opening in said reed-pipe or the like.

5. A sound-emitting and controlling means comprising a bellows, a reed-pipe or the like connected with and coöperating therewith, a sound-controlling element mounted upon said reed-pipe and telescoping therewith so as to be slidably disposed with relation to said bellows and said reed-pipe or the like, said reed-pipe being provided with a vent-opening, and the said slidable sound-controlling element being provided with a plurality of openings, said bellows comprising a pair of compressible bellows-members, a bracket attached to one of said bellows-members, a bell-crank pivoted upon said bracket, one of the arms of said bell-crank being operatively connected with the other bellows-member, and the other arm of said bell-crank being operatively connected with the sliding sound-controlling element for sliding said element and bringing the same into intermittent registration with the opening in said reed-pipe or the like, a hook-shaped element connected with said last-mentioned arm of the bell-crank, and a spring attached at one end to said hook-shaped element and at the other end to said first-mentioned bellows-member.

6. A sound-emitting and controlling means comprising a bellows, supports mounted upon said bellows, one of said supports having a chamber in communication with the interior of the bellows, a reed-pipe mounted between said supports and coöperating at one end with the chambered support and the said bellows, and a sound-controlling element mounted upon said reed-pipe and telescoping therewith so as to be slidably mounted upon said reed-pipe.

7. A sound-emitting and controlling means comprising a bellows, supports mounted upon said bellows, one of said supports having a chamber in communication with the interior of the bellows, a reed-pipe mounted between said supports and coöperating at one end with the chambered support and the said bellows, and a sound-controlling element mounted upon said reed-pipe and telescoping therewith so as to be slidably mounted upon said reed-pipe, said reed-pipe being provided with a vent-opening, and the said slidable sound-controlling element being provided with a plurality of openings, adapted to be brought into intermittent registration with the opening in said reed-pipe or the like.

8. A sound-emitting and controlling means comprising a bellows, supports mounted upon said bellows, one of said supports having a chamber in communication with the interior of the bellows, a reed-pipe mounted between said supports and coöperating at one end with the chambered support and the said bellows, a sound-controlling element mounted upon said reed-pipe and telescoping therewith so as to be slidably mounted upon said reed-pipe, said reed-pipe being provided with a vent-opening, and the said slidable sound-controlling element being provided with a plurality of openings, and means connected with the bellows and the said sound-controlling element for sliding said element and bringing the same into intermittent registration with the opening in said reed-pipe.

9. A sound-emitting and controlling means comprising a bellows, supports mounted upon said bellows, one of said supports having a chamber in communication with the interior of the bellows, a reed-pipe mounted between said supports and coöperating at one end with the chambered support and said bellows, a sound-controlling element mounted upon said reed-pipe and telescoping therewith so as to be slidably mounted upon said reed-pipe, said reed-pipe being provided with a vent-opening, and the said slidable sound-controlling element being provided with a plurality of openings, said bellows comprising a pair of compressible bellows-members, a bracket attached to one of said bellows-members, a bell-crank pivoted upon said bracket, one of the arms of said bell-crank being operatively connected with the other bellows-member, and the other arm of said bell-crank being operatively connected with the sliding sound-controlling element for sliding said element and bringing the same into intermittent registration with the opening in said reed-pipe.

10. A sound-emitting and controlling means comprising a bellows, supports mounted upon said bellows, one of said supports having a chamber in communication with the interior of the bellows, a reed-pipe mounted between said supports and coöperating at one end with the chambered support and the said bellows, a sound-controlling element mounted upon said reed-pipe and telescoping therewith so as to be slidably mounted upon said reed-pipe, said reed-pipe being provided with a vent-opening, and the said slidable sound-controlling element being provided with a plurality of openings, said bellows comprising a pair of compressible bellows-members, a bracket attached to one of said bellows-members, a bell-crank pivoted upon said bracket, one of the arms of said bell-crank being operatively connected with the other bellows-member, and the other arm of said bell-crank being operatively connected with the sliding sound-controlling element for sliding said element and bringing the same into intermittent registration with the opening in said reed-pipe, a hook-shaped element connected with said last-mentioned arm of the bell-crank, and a spring attached at one end to said hook-shaped element and at the other end to said first-mentioned bellows-member.

In testimony, that I claim the invention set forth above I have hereunto set my hand this 3rd day of September, 1915.

MICHAEL RABINOWITZ.

Witnesses:
FREDK. C. FRAENTZEL,
FREDK. H. W. FRAENTZEL.